No. 726,232. PATENTED APR. 21, 1903.
R. W. TEST & H. STABLER.
CARD GAME.
APPLICATION FILED AUG. 23, 1902.

NO MODEL. 4 SHEETS—SHEET 1.

Fig. 1

16 cards.
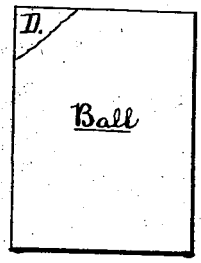
*D.* Ball 3 cards.
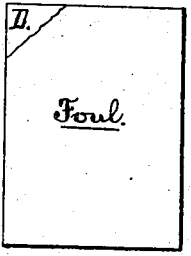
*D.* Foul.

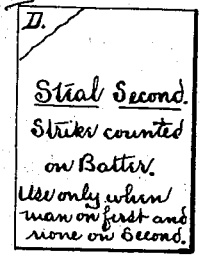
*D.* Steal Second. Strikes counted on Batter. Use only when man on first and none on Second.

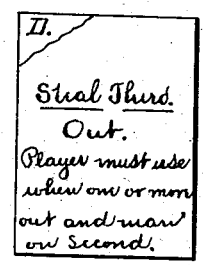
*D.* Steal Third. Out. Player must use when one or more out and man on Second.

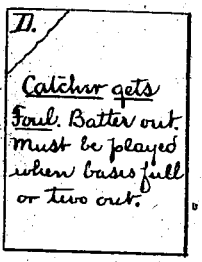
*D.* Catcher gets Foul. Batter out. Must be played when bases full or two out.

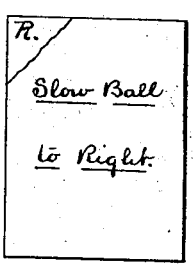
*R.* Slow Ball to Right.

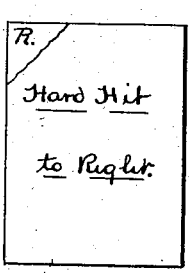
*R.* Hard Hit to Right.

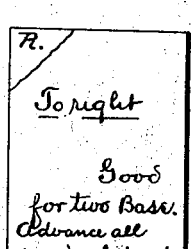
*R.* To right. Good for two Base. Advance all around unless out

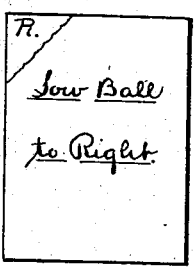
*R.* Low Ball to Right.

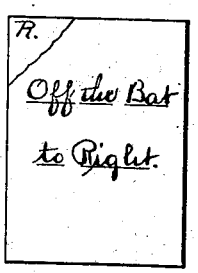
*R.* Off the Bat to Right.

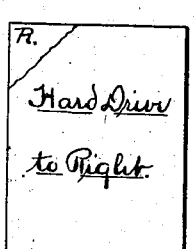
*R.* Hard Drive to Right.

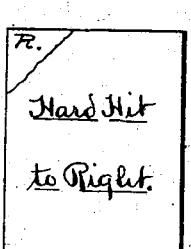
*R.* Hard Hit to Right.

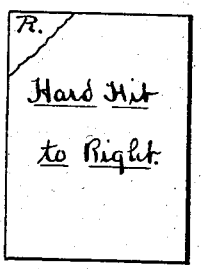
*R.* Hard Hit to Right.

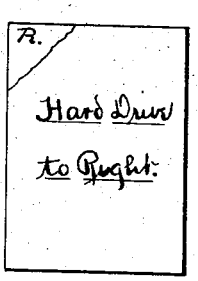
*R.* Hard Drive to Right.

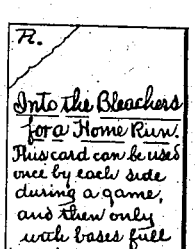
*R.* Into the Bleachers for a Home Run. This card can be used once by each side during a game, and then only with bases full or two on Base.

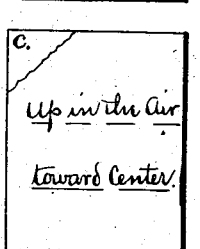
*C.* Up in the Air toward Center.

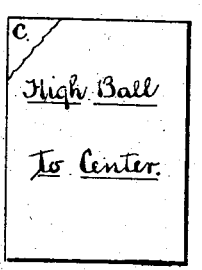
*C.* High Ball To Center.

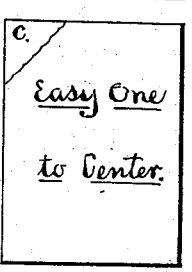
*C.* Easy One to Center.

Witnesses
B. D. Rowe
Oliver D. Baker

Inventors
Robt. W. Test.
Herman Stabler.
By David W. Gould.
Attorney

No. 726,232. PATENTED APR. 21, 1903.
R. W. TEST & H. STABLER.
CARD GAME.
APPLICATION FILED AUG. 23, 1902.
NO MODEL. 4 SHEETS—SHEET 2.
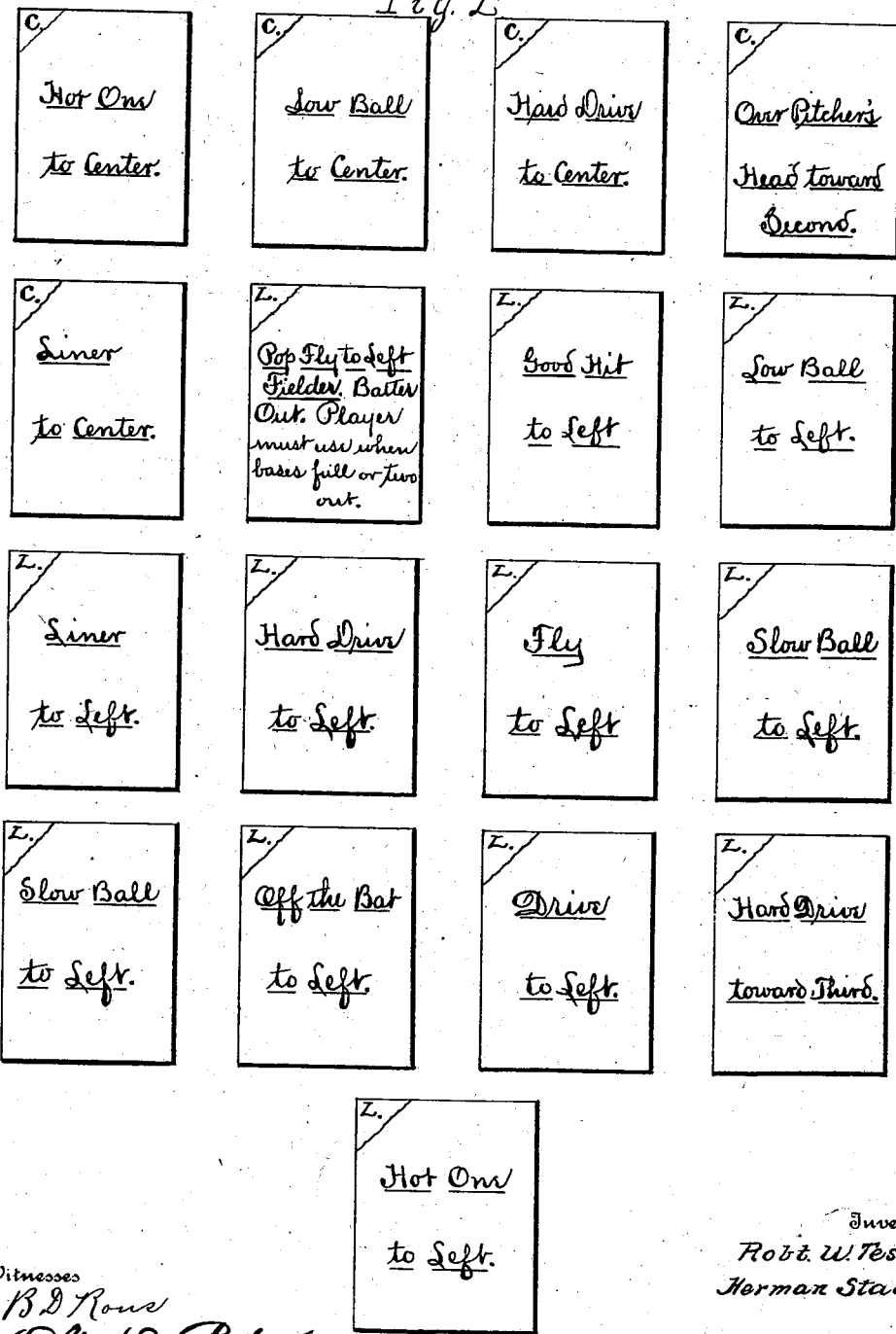

No. 726,232.

PATENTED APR. 21, 1903.

R. W. TEST & H. STABLER.

CARD GAME.

APPLICATION FILED AUG. 23, 1902.

NO MODEL.

4 SHEETS—SHEET 3.

Fig 3.

| 5 cards. | 4 cards. | 3 cards. | | |
|---|---|---|---|---|
| D. Strike by Batter. | D. Strike called by Umpire. | D. Foul Bunt. Counts strike on Batter. | D. Catcher gets Foul. Batter Out. | D. Third Baseman gets Foul. Batter Out. |
| D. Foul Tip caught by Catcher. Counts strike on Batter. | D. Wide Outshoot misjudged by Batter. Strike. | D. Pitcher throws man off First. Use only when pitcher holds ball preparatory to delivery, and man on First Base. | D. Pitcher throws to Second Base on Steal. Called out by umpire. Use only when man on first and no one on second. | D. Catcher throws to Second on Steal. Runner out. Use only after "Ball" or Steal Second played by opponent and only when man on first and no one on second. |
| D. Pitcher throws man off Third. Use only when pitcher has ball preparatory to delivery and man on 3rd Base. | D. Pitcher catches man off Second. Use only when pitcher has ball preparatory to delivery and man on 2nd Base. | R. First Baseman gets Foul. Batter Out. No advance on bases. | R. R.F. gets ball on fly. Batter Out. If man on 2nd or 3rd advance. If man on 1st hold base. | R. First Baseman gets ball and throws to Pitcher at 1st. Batter Out. All baserunners advance one base. |
| R. R.F. runs up makes good catch. Batter out. No advance on bases. | R. Second Baseman gets Ball. Throws leading baserunner out. All others advance one base. | R. Second Baseman gets Ball Throws to First. Batter out. Baserunners advance one base. | C. Pitcher gets ball and throws to First. Batter out. Baserunners advance one base. | C. Second Baseman throws to First. Batter out. Baserunners advance one base. |

Witnesses
B. D. Rowe
Oliver D. Baker

Inventors
Robt. W. Test.
Herman Stabler.

By David W. Gould,
Attorney.

THE NORRIS PETERS CO., PHOTO-LITHO., WASHINGTON, D. C.

No. 726,232. PATENTED APR. 21, 1903.
R. W. TEST & H. STABLER.
CARD GAME.
APPLICATION FILED AUG. 23, 1902.

NO MODEL. 4 SHEETS—SHEET 4.

Fig. 4.

C. Center Fielder gets ball on bounce, throws to ss. to Plate, heading baserunner, who may be batter, out at Plate. Other baserunners, if any, reach most advanced bases.

C. Center Fielder gets fly. Batter out. No advance on bases.

C. Short stop assists heading baserunner, who may be batter, out. Other baserunners advance one base.

C. Batter out at First on assist by short stop. If man on First ss. touches second throws to First. Two out. Others advance one Base.

L. Left Fielder catches ball. Batter out. No advance on bases.

L. Short stop to First. Batter out. Baserunners advance one base.

L. Left fielder throws Batter out at second. Baserunners advance two bases.

L. Short stop to First. Batter out. If man on Third he tries to reach home, but is thrown out at Plate by First Baseman. Other baserunners advance one base.

L. Short stop to First. Out. Baserunners advance one base.

L. Fine catch by Left fielder. Batter out. Man on Third goes home. Baserunners advance one base.

L. Third Baseman to First. Batter out. Baserunners advance one base.

L. Third Baseman assists Batter out at First. If man on Second and First, 3rd baseman touches bag, throws man out at First. Two out unless man on 1st or 3rd advance one base.

Safe Fielder gets ball on bounce. Base Hit. Baserunners advance one base.

Safe Baseman lets ball go through him. Fielder backs it up. Batter safe at First. Baserunners advance two bases.

Safe Fielder gets ball on bounce. Bad throw to First. Batter reaches second. Baserunners advance two bases.

Safe Fielder gets ball by fence. Safe two-base hit. Batter reaching second and all baserunners going home.

Safe Fielder throws to First. Umpire calls Batter safe. Baserunners advance one base.

Safe Fine stop but slow recover. All safe. Baserunners advance one base.

Safe Batter called safe at First. Baserunners advance one base.

Safe Three base hit over fielders' head. This card must be played when two out and only one on base. Otherwise at discretion.

Safe Close decision. Man safe at First. Infield play. No advance on bases unless man on First, then all basemen advance one base.

Safe Baseman makes good stop, but drops ball. Batter safe. Baserunners advance one base.

Safe Fielder gets ball at fence. Tries for Batter at second. Batter goes to Third. All baserunners reach home.

Witnesses
B. D. Rowe
Oliver D. Baker

By David W. Gould.

Inventors
Robt. W. Test.
Herman Stabler.

Attorney.

UNITED STATES PATENT OFFICE.

ROBERT W. TEST AND HERMAN STABLER, OF WASHINGTON, DISTRICT OF COLUMBIA.

CARD GAME.

SPECIFICATION forming part of Letters Patent No. 726,232, dated April 21, 1903

Application filed August 23, 1902. Serial No. 120,791. (No model.)

*To all whom it may concern:*

Be it known that we, ROBERT W. TEST and HERMAN STABLER, citizens of the United States, residing at Washington, District of Columbia, have invented certain new and useful Improvements in Card Games; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to an improved card game wherein a series of cards of particular relative significance are used.

The main object of the invention resides in the representation by cards, with or without the use of an accompanying diagram of the field of play, of the minute details and conditions of any outdoor sport wherein opposing forces are an essential element. In the use of the invention the pursuit of those sports now confined to actual field play is made possible, as the cards of our invention embody all the essential features of the field games and present to the mind of the player a vivid picture of the conditions and details of the particular game, at the same time permitting him to use discretionary judgment in the conduct of his play and bring to bear all the skill and knowledge he may possess relative to the requirements of any particular situation.

In carrying out the above object we provide a series of cards divided into two packs, one of which embodies the details of play possible by one of the opposing forces of the game, while the other embodies the possible answering plays of the other force. The cards of each pack are arranged in suits respectively similar and bearing similar identifying characters. The cards of the similar suits are arranged to indicate, respectively, plays and counterplays—that is, serve as leading cards and responsive cards—the latitude of the plays being limited only by the number of cards in a particular suit, it being understood that the play of a card from any suit of one pack is answerable by the cards from the similar suit of the other pack. No definite value is given any one card, as its value depends upon its use in the particular situation of the game with relation to preceding cards—that is to say, the player is allowed to use his own judgment as to which card of his hand will best serve his interests as a reply to the card played by the opposing side, in the use of which option it will be evident that the play will be largely determined by the skill and knowledge of the player coupled with what he believes to be the requirements of the particular situation.

In illustrating our invention we have deemed it advisable to show our cards arranged for the well-known game of base-ball, in the following detailed description of which one pack will be termed the "batters'" pack and the other the "fielders'" pack, the different cards of each pack being shown in the accompanying drawings, in which—

Figures 1 and 2 illustrate the different cards of the batters' pack. Figs. 3 and 4 illustrate the different cards of the fielders' pack.

Referring to the accompanying drawings, it will be noted that the cards of both packs are divided into respectively similar suits, for the present game four in number, and that such similar suits are indicated by identical characters—for example, by the letters "D," "R," "C," and "L." This letter identification is used simply for convenience, indicating "Delivery," "Right," "Center," and "Left," and particularly significant when the cards are arranged for base-ball, though we desire it to be understood that the suit-distinguishing marks may be any arbitrary sign or symbol, the only essential being that similar suits have similar identifying characters.

The batters' pack contains fifty-two cards and is divided into the four suits "D," "R," "C," and "L," the data on the cards of each suit indicating leading plays.

Suit "D" contains twenty-two cards bearing data as follows: Sixteen cards labeled "Ball." Three cards labeled "Foul." One card of each of the following: "Steal second. Counts strike on batter. Use only when man on first and none on second." "Steal third.

Out. Player must use when one or more out and man on second base." "Catcher gets foul. Batter out. Must be played when bases full or two out."

Suit "R" contains ten cards labeled, respectively, as follows: "Slow ball to right." "Hard hit to right." "To right. Good for two bases. Advance all around unless out." "Slow ball to right." "Off the bat to right." "Hard drive to right." "Hard hit to right." "Hard hit to right." "Hard drive to right," and "Into the bleachers for a home run. This card can be used only once by each side during a game and then only with bases full or two on base."

Suit "C" contains eight cards labeled, respectively, as follows: " Up in the air toward center." "High ball to center." "Easy one to center." "Hot one to center." "Low ball to center." "Hard drive to center." "Over pitcher's head toward second," and "Liner to center."

Suit "L" contains twelve cards labeled, respectively, as follows: "Good hit to left." "Low ball to left." "Liner to left." "Hard drive to left." "Fly to left." "Slow ball to left." "Slow ball to left." "Off the bat to left." "Drive to left." "Hard drive toward third." "Hot one to left," and "Pop fly to left fielder. Batter out. Player must use when bases full or two out."

The fielders' pack contains forty-one cards divided into four suits each containing cards bearing data responsive to any card of the similar suit of the other pack.

Suit "D" contains twenty-one cards labeled, respectively, as follows: five cards bearing "Strike by batter." Four cards bearing "Strike called by umpire." Three cards bearing " Foul bunt. Counts strike on batter," and one card of each of the following: "Catcher gets foul. Batter out." "Third baseman gets foul. Batter out." "Foul tip caught by catcher. Counts strike on batter." "Wide outshoot misjudged by batter. Strike." "Pitcher throws man off first. Use only when pitcher holds ball preparatory to delivery and man on first." "Pitcher throws to second base on steal. Called out by umpire. Use only when man on first and none on second." "Catcher throws to second on steal. Runner out. Use only after 'Steal second' or 'Ball,' as played by opponent and only when man on first and none on second." "Pitcher throws man off third. Use only when pitcher has ball preparatory to delivery and man on third base." "Pitcher catches man off second. Use only when pitcher has ball preparatory to delivery and man on second base."

Suit "R" contains six cards labeled, respectively, as follows: "First baseman gets foul. Batter out. No advance on bases." "Right fielder gets ball on fly. Batter out. If man on second or third, advance. If man on first, hold base." "First baseman gets ball and throws to pitcher at first. Batter out. All base-runners advance one base." "Right fielder runs up. Makes good catch. Batter out. No advance on bases." "Second baseman gets ball. Throws leading base-runner out. All others advance one base." "Second baseman gets ball. Throws to first. Batter out. Base-runners advance one base."

Suit " C" contains six cards labeled, respectively, as follows: "Pitcher gets ball and throws to first. Batter out. Base-runners advance one base." "Second baseman throws to first. Batter out. Base-runners advance one base." "Center fielder gets ball on bounce. Throws to short-stop. To plate. Leading base-runner, who may be batter, out at plate. Other base-runners, if any, reach most advanced bases." "Center fielder gets fly. Batter out. No advance on bases." "Short-stop assists. Leading base-runner, who may be batter, out. Other base-runners advance one base." "Batter out at first on assist by short-stop. If man on first, short-stop touches second. Two out. If man on second or third, advance one base."

Suit "L" contains eight cards labeled, respectively, as follows: "Left fielder catches ball. Batter out. No advance on bases." "Short-stop to first. Batter out. Base-runners advance one base." "Left fielder throws batter out at second. Base-runners advance two bases." "Short-stop to first. Batter out. If man on third, he tries to reach home, but is thrown out at plate by first baseman. Other base-runners advance one base." "Short-stop to first. Out. Base-runners advance one base." "Fine catch by left fielder. Batter out. If man on third, goes home. No other advance on bases." "Third baseman to first. Batter out. Base-runners advance one base." "Third baseman assists. Batter out at first. If man on second and first, third baseman touches bag. Throws man out at first. Two out. With men on first or third, advance one base."

In view of the fact that on a play by the batter not met or "counted out" by the fielder's play such batter must be called "safe" we have added to the fielders' pack eleven cards indicating plays or returns by the fielder in which the batter is not met, but is safe. This additional number of cards brings the fielders' deck up to fifty-two, the same as the batters' pack. For convenience these additional cards are marked with the suit-mark "Safe" and contain data as follows: "Fielder gets ball on bounce. Base hit. Base-runners all advance one base." "Baseman lets ball go through him. Fielder backs it up. Batter safe at first. Base-runners all advance two bases." "Fielder gets ball on bounce. Bad throw to first. Batter reaches second base. Base-runners all advance two bases." "Fielder gets ball by fence. Safe two-base hit, batter reaching second and all base-runners going home." "Fielder throws to first.

Umpire calls safe. Base-runners advance one base." "Fine stop, but slow recover. All safe. Base-runners advance one base." "Batter called safe at first. Base-runners advance one base." "Three-base hit over fielder's head. This card must be played when two out and only one on base. Under other conditions to be played at discretion." "Close decision. Man safe at first. Infield play. No advance on bases unless man on first. Then all advance one base." "Baseman makes good stop, but drops ball. Batter safe. Base-runners all advance one base," and "Fielder gets ball at fence and tries for batter at second. Batter goes to third. All base-runners reach home."

The following general directions are given to control the respective plays: The game may be played by two, four, or six persons, differing only in the number of cards held by each player. For two-handed game choice of sides is made. Batter takes fielders' pack, shuffles, and deals fielder six cards. Fielder shuffles and deals six cards from batters' pack to batter. Batter leads and fielder follows, as now noted.

Batters: First, play suit "D" if card of this suit is held. Second, play other cards at discretion. N. B.—The following cards of the batters' pack are to be played according to directions on them and are exempt from the usual rules of the game, both for batters' play and fielders' reply: "Home run," "Catcher gets foul," "Steal third—out," "Steal second," and "Pop fly to left fielder."

Fielders: First, if batter plays from suits "R," "C," or "L," play any card of corresponding suit desired. Second, if no card of corresponding suit is held, play any "Safe" card. Third, if no "Safe" card is held, call "Safe at first. One base advance." Fourth, if batter plays a card of suit "D" or one of the excepted cards not in suit "D" or fielder has called "Safe at first, one base advance," play a card from suit "D;" but if no card of this suit is held or no other card that can properly be played, call "Play ball," and the batter will play again. After each play the player shall draw one card from his respective pack, always retaining the same number of cards in his hand. The fielder does not lose a turn when he cannot follow suit and declares "Play ball" or "Safe at first," &c., as in these instances he may play in his turn if he holds a card to suit the situation at the time.

The fielders and batters change places and packs at end of each half-inning.

It is not deemed advisable to set forth the details incident to the play of a game of baseball in the use of our cards, as any one at all familiar with the usual field game will at once understand and be able to play the game without further instructions. However, for the purpose of indicating the variations resultant from the use of the cards the play of one-half inning will be outlined.

| | |
|---|---|
| Batter's hand plays | "Ball." |
| Fielder's hand plays | "Strike called on batter." |
| Batter's hand plays | "Ball." |
| Fielder's hand plays | "Strike by batter." |
| Batter's hand plays | "Foul." |
| Fielder's hand plays | "Catcher gets foul." |

One man out.

| | |
|---|---|
| Batter's hand plays | "Ball." |
| Fielder's hand plays | "Strike." |
| Batter's hand plays | "Hard hit to left." |
| Fielder's hand plays | "Third baseman throws batter out at first." |

Two men out.

Batter's hand plays............"Ball."
Fielder cannot respond with suit "D," having no card of the suit in his hand, and says "Play ball."
Batter then plays.............."Hard drive to center."
Fielder cannot follow suit, so plays a "Safe" card. "Good stop, but slow recover. All safe."
This places a man on first base.
Batter's hand plays............"Liner to center."
Fielder still cannot follow suit, so plays another "Safe" card. "Fielder gets ball at fence, tries for batter at second, batter goes on to third."
This scores the man who was on first and leaves the batter to play again, with a man on third.
Batter's hand plays............"Over pitcher's head toward second."
Fielder's hand plays, having a "Second baseman throws to "C" suit in filling his hand first. Batter out." from the pack.
Third man out, side having made one run.

While we have illustrated and described the invention as applicable to base-ball, it is to be understood that we do not limit ourselves thereto, as the cards may by simply changing the indicating data thereon be adapted for any game in which opposing forces contest, the only essential being that the cards be divided into two or more separate packs and each pack divided into suits respectively similar, the cards of one suit of one pack indicating possible leading plays by one side and the cards of the similar suit of the other pack indicating replies or counterplays thereto by the other side.

It is understood that the cards are to be printed so as to be properly read from either end, as is usual, in order to avoid one or more of the cards being reversed in the hand.

What we claim is—

1. A card game comprising two packs of cards, one pack bearing data to serve as leading cards and the other pack bearing data to serve as responsive cards, both packs being divided into the same number of suits having respectively similar suit-marks, as and for the purposes stated.

2. A card game comprising two packs of cards, each divided into suits having respectively similar suit-marks, the suits of one pack being leading suits and the suits of the other pack being respectively responsive thereto, whereby when a card of a leading suit is played any card of its responsive suit may be played at the option of the player.

3. A card game comprising two packs of cards, each divided into suits, the suits of one pack being leading suits and the suits of the other pack being respectively responsive thereto, the cards of any one suit of the leading suits and of the corresponding responsive suit bearing data indicating respectively a particular line of play and response not found in any of the other suits, as and for the purposes stated.

4. A card game arranged for base-ball comprising a batters' pack and a fielders' pack, each divided into suits bearing respectively similar suit-marks, the suits of the batters' pack being leading suits and indicating lines of play, and the suits of the fielders' pack being responsive suits and indicating replies to the corresponding batters' suit, and an additional suit for the fielders' pack, the cards of which indicate plays by the fielder to the advantage of the batter.

In testimony whereof we affix our signatures in presence of two witnesses.

ROBERT W. TEST.
HERMAN STABLER.

Witnesses:
DAVID W. GOULD,
CLAUDE I. PARKER.